(12) United States Patent
Hutter et al.

(10) Patent No.: US 6,427,884 B1
(45) Date of Patent: Aug. 6, 2002

(54) ARRANGEMENT FOR STORING A SPARE TIRE

(75) Inventors: Robert B Hutter, South Lyon; Joseph F Humphreys, Jr., Waterford; Brian C Lazarus, Novi, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/587,041

(22) Filed: Jun. 2, 2000

(51) Int. Cl.[7] .............................................. B62D 43/00
(52) U.S. Cl. ................. 224/42.23; 224/42.24; 224/538; 414/462; 414/463
(58) Field of Search .................... 224/42.23, 42.24, 224/538; 414/462, 463

(56) References Cited

U.S. PATENT DOCUMENTS

| | | | | |
|---|---|---|---|---|
| 2,028,945 A | * | 1/1936 | Morrison | 224/42.23 X |
| 4,492,506 A | * | 1/1985 | Hoagland et al. | 414/463 |
| 5,076,629 A | | 12/1991 | Peters et al. | 296/37.2 |
| 5,238,358 A | * | 8/1993 | Higgins et al. | 414/463 |
| 5,718,553 A | * | 2/1998 | Via et al. | 414/463 |
| 5,791,859 A | * | 8/1998 | Simnacher | 414/463 |
| 5,967,389 A | | 10/1999 | Hutter et al. | 224/42.21 |
| 5,993,133 A | * | 11/1999 | Murray et al. | 414/463 |

* cited by examiner

Primary Examiner—Stephen K. Cronin
(74) Attorney, Agent, or Firm—Lisa K. Mack

(57) ABSTRACT

An arrangement for storing a spare tire includes a cable coupled to the spare tire. A winch device is disposed between the motor vehicle and the cable and is operative for raising and lowering the tire in response to actuation thereof. A spring device is coupled between the bottom surface of the motor vehicle and the spare tire. The spring device is operative for positioning the spare tire in an accessible position when the spare tire is being lowered.

14 Claims, 2 Drawing Sheets

ARRANGEMENT FOR STORING A SPARE TIRE

BACKGROUND OF THE INVENTION

1. Field of the Invention

The present invention generally relates to motor vehicles. More particularly, the present invention relates to an arrangement for storing a spare tire under the floor of a motor vehicle.

2. Discussion

An example of a prior art vehicle spare tire mounting arrangement is shown in commonly assigned U.S. Pat. No. 5,076,629, which is hereby incorporated by reference as if fully set forth herein. The arrangement positions the spare tire immediately below the floor panel of a motor vehicle and includes an elongated carrier member suspended from the vehicle. First and second holding rods cooperate with the carrier member for storing the spare tire. The carrier member includes a main tire support portion having first and second connectors adjacent each end thereof with each connector offset a predetermined dimension from one side of the main support portion. The first holding rod lower end is attached to the first end connector by a universal hinge assembly enabling the carrier member, upon release of the second holding rod from the second connector, to be pivoted about a transverse horizontal axis from a horizontal tire stowage position to a downwardly angled tire removal position. A universal hinge assembly enables the operator to rotate the downwardly angled carrier member about its longitudinally extending axis of rotation, which includes the end connectors between a pair of tire stowage modes.

The end connectors are oriented below the main support portion such that a tire is adapted to be supported on one side of the main support portion. To attain an alternate stowage mode, the universal hinge assembly is unlocked and the carrier member rotated 180 degrees. The end connectors are oriented above the main support portion enabling a maximum thickness tire to be supported on the opposite side thereof.

Arrangements of the type shown and described in U.S. Pat. No. 5,076,629 remove the spare tire from other known mounting locations, such as within the vehicle or on a rear panel of the vehicle. In this manner, the cargo carrying capacity of the motor vehicle is not impeded and access to the vehicle is not restricted. However, access to the spare tire may be difficult. Primarily in this regard and insofar as the present invention is concerned, typical arrangements for mounting a spare tire to the underside of a floor panel may be difficult to access.

Thus, need remains in the art for an arrangement which mounts the spare tire to the underside of a floor panel which is operative for lowering the spare tire to a position more readily accessed by a user.

SUMMARY OF THE INVENTION

It is an advantage of the present invention to provide an arrangement for storing a spare tire under the floor pan of a vehicle which rearwardly displaces the spare tire upon release.

In one form, the present invention provides a mounting arrangement for storing a spare tire under a floor panel of the motor vehicle. The arrangement includes a cable coupled to the spare tire. A winch device is disposed between the motor vehicle and the cable and is operative for raising and lowering the tire in response to actuation thereof. A spring device is coupled between the bottom surface of the motor vehicle and the spare tire. The spring device is operative for biasing the spare tire rearward relative to the motor vehicle when the spare tire is being lowered.

In another form, the present invention provides a method of lowering a spare tire from a stored position adjacent an underside of a floor panel of a motor vehicle. The motor vehicle includes a cable interconnecting the spare tire and the underside of the floor panel and a winch device for winding and unwinding the cable to raise and lower the spare tire, respectively. The method includes the step of interconnecting the underside of the motor vehicle and the spare tire with a biasing mechanism. The method further includes the step of rearwardly biasing the spare tire relative to the motor vehicle against a gravitational force as the spare tire is lowered.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
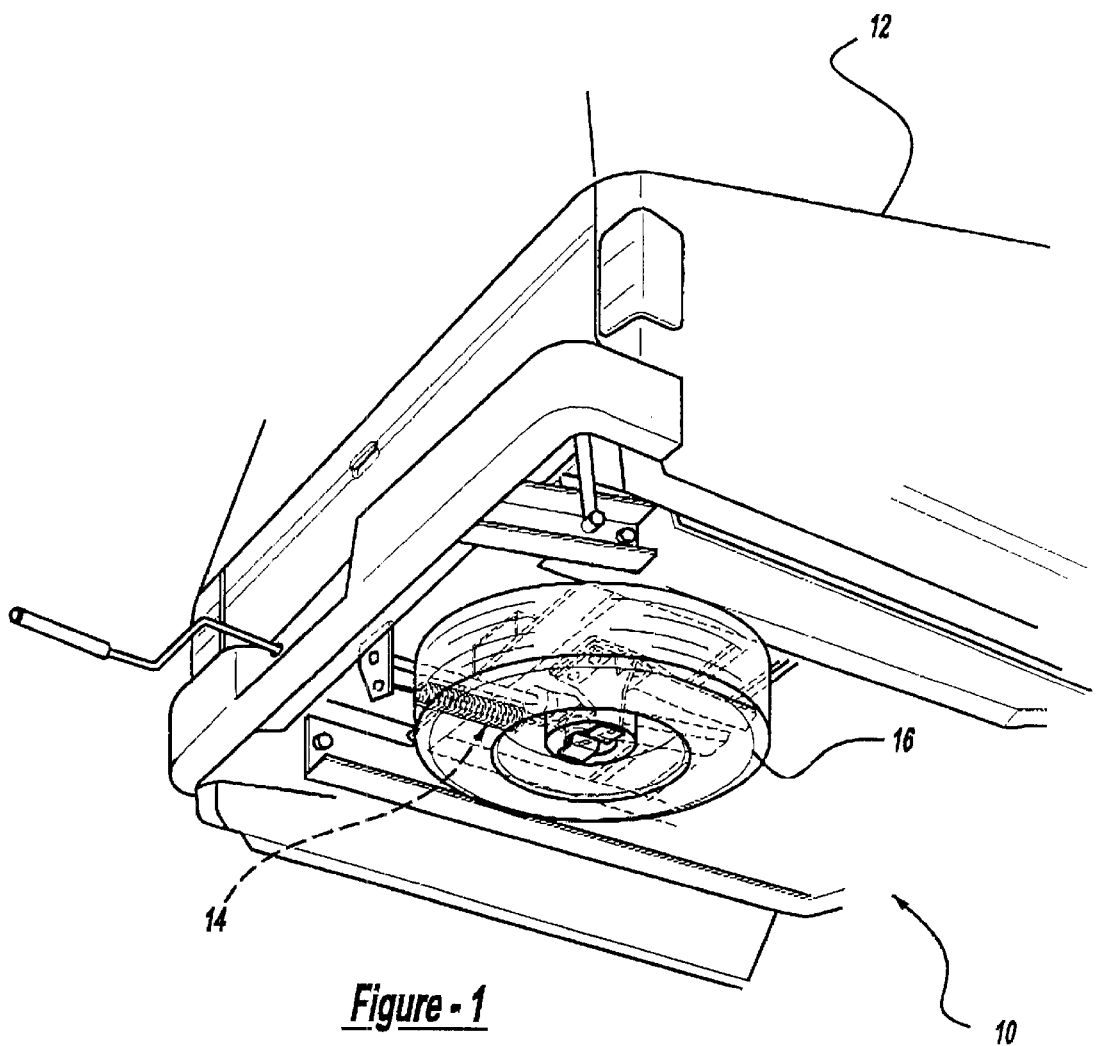
FIG. 1 is an arrangement for storing a spare tire of a motor vehicle shown operatively associated with a portion of a motor vehicle, the spare tire shown in a raised position.
Figure 2:
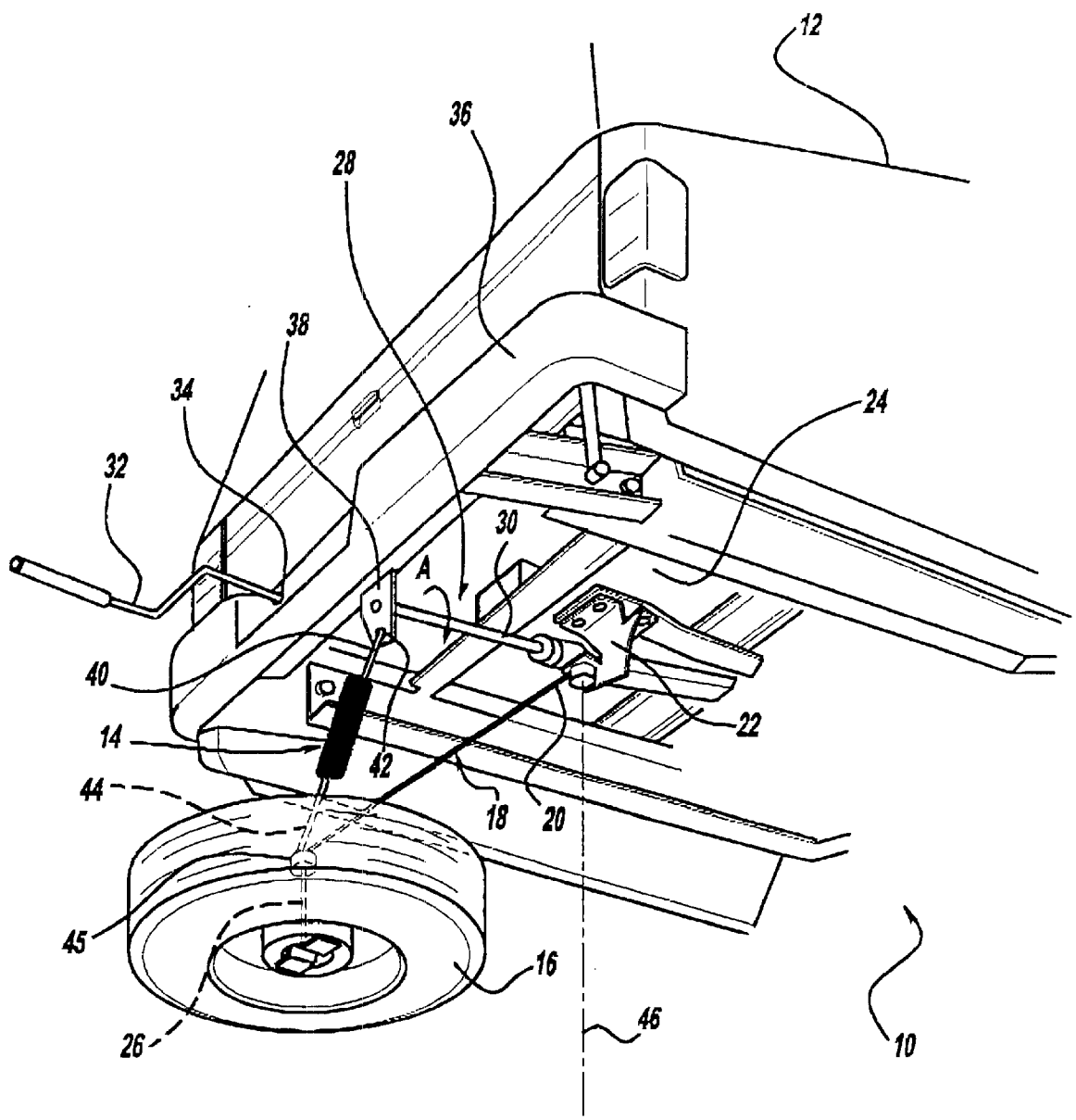
FIG. 2 is a perspective view similar to FIG. 1, illustrating the spare tire in a lowered position.

With reference to FIGS. 1 and 2, a mounting arrangement for storing a spare tire under a floor panel of a motor vehicle constructed in accordance with the teachings of a preferred embodiment of the present invention is illustrated and generally identified at reference numeral 10. The mounting arrangement 10 is shown operatively associated with an exemplary motor vehicle 12. In the embodiment illustrated, the exemplary motor vehicle 12 is a pickup truck. However, it will become apparent to those skilled in the art that the teachings of the present invention are not limited to any particular type of vehicle.

The present invention is specifically directed to an arrangement including a biasing mechanism 14 which cooperates with an otherwise conventional arrangement to assist with the lowering of the spare tire 16 from a raised or stored position to a lowered or released position. The raised position of the spare tire 16 is illustrated in FIG. 1. The lowered position of the spare tire 16 is shown in FIG. 2. Now turning to the construction and operation of the biasing mechanism 14, the conventional aspects of its exemplary use environment will be described.

A cable 18 couples the spare tire 16 with an underside of the motor vehicle 12. As shown, a first end 20 of the cable 18 is secured to a mounting bracket 22 which is, in turn, fixedly attached to an underside of a floor pan or panel 24 of the motor vehicle 12. A second end 26 of the cable 18 is secured to the spare tire 16. A winch device 28 is operative for raising and lowering the spare tire 16 in response to actuation thereof. The winch device 28 includes a rotatable element 30 mounted for rotation about its longitudinal axis.

When the rotatable element is rotated in a first direction (as indicated by arrow A in FIG. 2) the cable 18 is coiled and the spare tire 16 is moved to its raised position. For purpose of rotating the rotatable member 30, the winch device 28 further includes a removable handle or crank 32 which is inserted into an aperture 34 provided proximate a rear bumper or fascia 36 of the motor vehicle. Lowering of the spare tire 16 is accomplished in an opposite manner.

It will again be understood that the winch device 28 and the cable 18 which interconnects the floor panel 24 and the spare tire 16 are conventional in construction. One suitable arrangement is commercially available on the 2000 Dodge Durango manufactured by the Assignee of the subject application. It will be understood that other functionally equivalent arrangements may be incorporated within the scope of the teachings of the subject invention.

With continued references to FIGS. 1 and 2, the biasing mechanism 14 is illustrated as a spring device which interconnects an underside of the motor vehicle 12 and the spare tire 16. In the exemplary embodiment, the spring device is a coil spring 14. A mounting bracket 38 is secured to the underside of the motor vehicle 12 proximate the rear bumper 36 through welding or any other conventional manner. A first end 40 of the spring device 14 is secured to the mounting bracket 38. As shown most particularly in FIG. 2, the first end 40 of the spring device 14 engages an aperture 42 provided in the mounting bracket 38. A second end 44 of the spring device is connected to the cable 18 proximate the end 26 of the cable 18 which is secured to the spare tire 16. In the embodiment illustrated, the end 44 of the spring 14 is shown secured to a mounting member 45 which is in turn secured to the cable 18. Alternatively, it will be understood that the spring 14 may be directly secured to the spare tire 16. While not specifically shown, it will be understood that in certain applications it may be desired to cover the tensioning mechanism 14 with a sleeve to protect the biasing mechanism 14 from corrosion.

In operation, the biasing mechanism 14 provides a biasing force for rearwardly biasing the spare tire 16 against a gravitational force as the spare tire 16 is moved to the lowered position. Without the biasing mechanism, the gravitational force would direct the spare tire downward along a vertical axis 46 passing through the attachment point of the cable 18 to the motor vehicle 12. The biasing mechanism 14 rearwardly displaces the spare tire 16 such that the spare tire 16 is substantially positioned beneath the rear bumper or fascia 36 in its lowered position and thereby more readily accessible.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A mounting arrangement for storing a spare tire under a floor panel of a motor vehicle in combination with the motor vehicle, the arrangement comprising:

a cable coupled to the spare tire;

a winch device between the motor vehicle and the cable to raise and lower the spare tire in response to actuation thereof; and a spring device coupled between the bottom surface of the motor vehicle and the spare tire, the spring device for biasing the spare tire rearward relative to the motor vehicle when the spare tire is being lowered.

2. The arrangement for storing a spare tire under a floor pan of a motor vehicle of claim 1, further comprising a mounting bracket coupled to a bottom surface of the motor vehicle, the spring device interconnecting the mounting bracket and the spare tire.

3. The arrangement for storing a spare tire under a floor pan of a motor vehicle of claim 1, wherein the mounting bracket is positioned proximate a rear end of the motor vehicle.

4. The arrangement for storing a spare tire under a floor pan of a motor vehicle of claim 1, wherein an end of the spring device is secured to the cable.

5. The arrangement for storing a spare tire under a floor pan of a motor vehicle of claim 4, wherein the end of the spring device is secured to the cable proximate an end of the cable attached to the spare tire.

6. The arrangement for storing a spare tire under a floor pan of a motor vehicle of claim 1, wherein the spring device is a coil spring.

7. The arrangement for storing a spare tire under a floor pan of a motor vehicle of claim 1, wherein the winch device is operative for moving the spare tire between a raised position and a lowered position and further wherein the spring device is operative for rearwardly biasing the spare the spare tire against a gravitational force as the spare tire is moved to the lowered position.

8. A motor vehicle comprising:

a body including a floor pan and a rear bumper or fascia;

a spare tire;

a winching arrangement including a cable interconnecting the floor panel and the spare tire, the winching arrangement operative for moving the spare tire between a raised position and a lowered position such that the spare tire is positioned adjacent an underside of the floor pan in the raised position; and a biasing mechanism rearwardly biasing the spare tire against a gravitational force as the spare tire is moved from the raised position to the lowered position, the biasing mechanism interconnecting the motor vehicle and the spare tire.

9. The motor vehicle of claim 8, further comprising a bracket coupled to a bottom surface of the motor vehicle, the biasing mechanism interconnecting the mounting bracket and the spare tire.

10. The motor vehicle of claim 8, wherein the mounting bracket is positioned approximate a rear end of the motor vehicle.

11. The motor vehicle of claim 8, wherein the tensioning mechanism includes an end secured to the cable.

12. The motor vehicle of claim 11, wherein the end of the tensioning mechanism is secured to the end of the cable proximate an end of the cable attached to the spare tire.

13. The motor vehicle of claim 8, wherein the tensioning mechanism includes a coil spring.

14. A method of lowering a spare tire from a stored position adjacent an underside of a floor panel of a motor vehicle, the motor vehicle including a cable interconnecting the spare tire and the underside of the floor panel and a winch device for winding and unwinding the cable to raise and lower the spare tire, respectively, the method comprising the steps of:

interconnecting the underside of the motor vehicle and the spare tire with a biasing mechanism; and rearwardly biasing the spare tire relative to the motor vehicle against a gravitational force as the spare tire is lowered.

\* \* \* \* \*